United States Patent [19]

Peugh et al.

[11] Patent Number: 4,485,758

[45] Date of Patent: Dec. 4, 1984

[54] COATING THICKNESS AND WEDGE GEOMETRY CONTROL FOR MAGNETIC DISKS

[75] Inventors: Herbert V. Peugh, San Jose; Albert W. Ward, Santa Cruz, both of Calif.

[73] Assignee: International Business Machines Corporation, Armonk, N.Y.

[21] Appl. No.: 500,067

[22] Filed: Jun. 1, 1983

Related U.S. Application Data

[63] Continuation-in-part of Ser. No. 317,369, Nov. 2, 1981.

[51] Int. Cl.³ .............................................. B05C 11/12
[52] U.S. Cl. ...................................... 118/52; 118/240; 118/401
[58] Field of Search ................ 427/130; 118/240, 401, 118/52

[56] References Cited

U.S. PATENT DOCUMENTS 4,133,911  1/1979  Koester et al. .................... 427/130

*Primary Examiner*—Bernard D. Pianalto
*Attorney, Agent, or Firm*—Walter J. Madden, Jr.; Henry E. Otto, Jr.

[57] ABSTRACT

In spin coating a liquid magnetic dispersion onto a rotating annular substrate, a stationary fluid barrier member is positioned closely adjacent the substrate after deposition of the dispersion thereon and during the time the excess dispersion is spun off, the substrate has a radial opening therein which permits fluid communication between the outer portion of the fluid barrier and its inner portion. The barrier member serves to reduce the rate of solvent evaporation from the dispersion so that the dispersion flows more readily during spin-off to produce a thinner resulting magnetic coating.

5 Claims, 3 Drawing Figures

COATING THICKNESS AND WEDGE GEOMETRY CONTROL FOR MAGNETIC DISKS

CROSS REFERENCE TO RELATED APPLICATION

This application is a continuation-in-part of application Ser. No. 317,369, filed Nov. 2, 1981 and assigned to the same assignee as the present application.

BACKGROUND OF THE INVENTION

1. Field of the Invention

The present invention relates to an improved apparatus for the manufacture of magnetic disks carrying very thin magnetic layers by applying a fluid dispersion of magnetic materials in a binder mixture to rigid disk substrates by a spin-coating process while controlling the coating thickness and coating profile.

2. Description of the Prior Art

Magnetic recording media in the form of rotating disks are extensively used as memories which allow rapid access to any desired position on a disk. Two important factors relating to such disk memories are the amount of information which can be stored thereon, which is usually described as the recording density and is expressed in bits per inch, and their magnetic properties, which influence the output signals of the magnetic disk. The achievable recording density in turn depends on the thickness of the magnetic coating, and in general, the thinner the coating, the higher the recording density can be.

There is a growing demand for magnetic disks which produce higher and higher recording densities while still retaining an output signal which is suitable for further processing. If these very thin magnetic coatings are used, the heads, which fly on a layer of air which is present between the magnetic disk and the head, have to be brought close to the recording medium. In the case of magnetic disks which have a magnetic layer about 1μ thick, the distance between the flying head and the disk surface is so small (the distance being only from 0.2 to 0.6μ) that the recording surface must be extremely flat.

It has been known in the art for many years to manufacture disk memories by coating an aluminum disk substrate with a liquid dispersion which contains a magnetizable material finely dispersed in a curable binder, subsequently drying and/or curing this coating and, if desired, also buffing and/or polishing it. A coating technique which has proved particularly successful is the spin-coating process, in which the disk substrate is caused to rotate and the coating mixture is allowed to flow onto it, as is described for example in U.S. Pat. No. 3,198,657. To achieve a thin magnetic layer, the excess dispersion which has been applied is then spun off.

In the production of magnetic coatings for magnetic disks, a suitable method has proved to be to pour the dispersion which usually contains finely divided; magnetic pigments, (e.g. gamma-iron oxide, magnetite or ferromagnetic metal) with particle sizes of from about 0.2 to 1μ, and binders, especially heat-curable binders, such as epoxy resins, phenolic resins, aminoplast precondensates, polyester resins, polyurethanes or polyurethane-forming compounds, or mixtures of such binders with one another or with other binders, such as polycarbonates or vinyl polymers, for example vinyl chloride or vinylidene chloride copolymers, or heat-curable acrylate or methacrylate copolymers. In general, the magnetic dispersions also contain volatile solvents to produce a dispersion which can be poured through a nozzle, for example, tetrahydrofuran, toluene, methyl ethyl ketone and the like, the type of solvent used depending, inter alia, on the binder employed.

After cleaning the base disk substrates with solvent, the magnetic dispersion is poured from a nozzle under slight pressure in the spin-coating process, wherein an excess of the magnetic dispersion is deposited on the rotating disk substrate from the nozzle which can be moved parallel to the disk substrate surface in a radial direction. During such pouring in one method, the nozzle moves from the inner edge to the outer edge of the disk or preferably from the outer edge to the inner edge and then from the inner edge back to the outer edge. In an alternate embodiment, the nozzle moves radially from the outside diameter toward the inside diameter of the substrate without pouring any dispersion, and pouring does not begin until the nozzle nears the inside diameter of the substrate. Disks produced by such a spin coating process usually have an inherent wedge in the coating thickness, this thickness increasing from the inside diameter (ID) through the middle diameter (MD) to the outside diameter (OD) of the coated disk as a result of the spin coating method.

As indicated above, there is a continual need for higher performance magnetic recording disks and such higher performance means thinner and thinner magnetic recording media. To date, the methods used to generate the thinner media has been to adjust the coating viscosity and solvent balance, spin the disk at increased RPM's or grind more coating off in the buffing operation. None of these techniques seem to be a viable approach for achieving the thinner disks of the future. Control of the coating wedge has been nearly impossible using the above-mentioned techniques. In the past, this has not been a major problem because the natural wedge of 10μ" created during the spin coating operation was approximately what was needed for the finished disk. Future disk requirements may include a flat recording media or a near no-wedge disk.

It has been discovered that by placing a fluid-flow barrier over a magnetic oxide coated disk during the spin-off portion of the spin coat cycle, the barrier having an opening, groove, or tunnel therein, the coating thickness can be reduced by 30-50%. It has also been found that this innovation can be used to produce any coating wedge desired.

PRIOR ART

U.S. Pat. Nos. 4,331,911 and 4,201,149 show apparatus for use in spin coating magnetic disks to reduce the amount of streaking produced in the finished coated disk. This apparatus includes a pair of plate members spaced from the substrate on each side thereof and rotating with the substrate during the spin coating operation. The theory of these patents is that the plate members reduce the air flow over the spin coated coating to thereby reduce air flow-induced streaks in the coating.

U.S. Pat. No. 4,353,937, Chiba et al, discloses a disk coating technique in which a shield plate and a bottom plate are positioned on opposite sides of a disk which is to be simultaneously coated on both sides.

The problem addressed in this patent is coating thickness variations between the top and bottom surfaces of a disk when both sides are coated simultaneously in the horizontal plane. This patent uses an enclosure to contain solvent vapor to reduce solvent evaporation from the disk and produce thinner coatings. A thickness difference was created using this technique which was resolved by placing a shield plate under the disk to prevent solvent vapor from influencing the bottom surface. From the drawing, it appears that both the barrier and the shield are a great distance from the disk being coated.

U.S. Pat. No. 3,705,048, Staunton, discloses apparatus for handling slides containing blood samples. The slide is placed in a rotatable carrier and a hinged cover is positioned closely adjacent the slide as the slide is rotated, the cover serving to reduce buffeting and drying of the blood sample.

However, none of these patents teach the use of a stationary fluid flow barrier having a controllably shaped opening therein for use in spin coating to control the fluid flow over the coated disk in a number of different manners. Further, these patents employ a spacing between the plate members and the substrate to be coated which is significantly greater than that found to be useful in the present invention.

SUMMARY OF THE INVENTION

The present spin coat invention involves a stationary disk or plate (a fluid barrier) approximately the same diameter as the substrate being coated which is positioned closely adjacent to the coated disk during the spin-off cycle of the spin coat operation. The barrier has a radial opening therein, the shape of this opening being capable of being varied to thereby vary the resulting coating thickness and profile. The barrier allows the coating to remain liquid by cutting off fluid flow and retarding the solvent evaporation, thereby permitting the coating to flow to a thinner, more uniform film via centrifugal force.

DESCRIPTION OF THE PREFERRED EMBODIMENT

The invention is an apparatus for reducing the as-coated disk coating thickness and controlling the coating wedge and wedge profile on a magnetic oxide coated disk. The barrier provided by this invention controls the coating viscosity on a disk surface during the disk spin-off operation by retarding the coating solvent loss. The retarded solvent loss permits the coating to remain fluid and flow to a thinner more uniform film than can be achieved using conventional spin coat techniques. The coating wedge and wedge profile, (the disk ID-MD-OD coating thickness difference) can also be controlled by the barrier. The barrier is a flat stationary plate with a diameter not substantially greater than that of the disk being coated, and is positioned closely adjacent to the coated disk during the disk spin-off cycle. The plate has a radially extending opening therein extending from the outer portion of the plate to the inner portion to permit air or other fluid communication therebetween. Changes in the disk coating thickness, coating wedge, and coating wedge profile are achieved in the following manner when using the barrier.

The disk's magnetic coating thickness in the unbuffed state is dependent on coating formulation, coating viscosity and the disk spin-off rpm, whether conventional or barrier spin coating is used. Barrier spin coating adds the fourth factor of controlled solvent loss during the disk spin-off cycle. This can reduce the coating thickness up to 30% at the disk ID. This reduction is dependent only on the barrier being adjacent to the disk being coated and is essentially independent of any barrier-disk spacing between 0.025" and 0.100". The coating wedge and the disk OD coating thickness is dependent on the barrier spacing. As the spacing is increased, the coating wedge increases. The normal disk coating wedge on present products is between $10\mu"$ and $15\mu"$ which is not desirable for future products and cannot be controlled using conventional spin coating.

Figure 1:
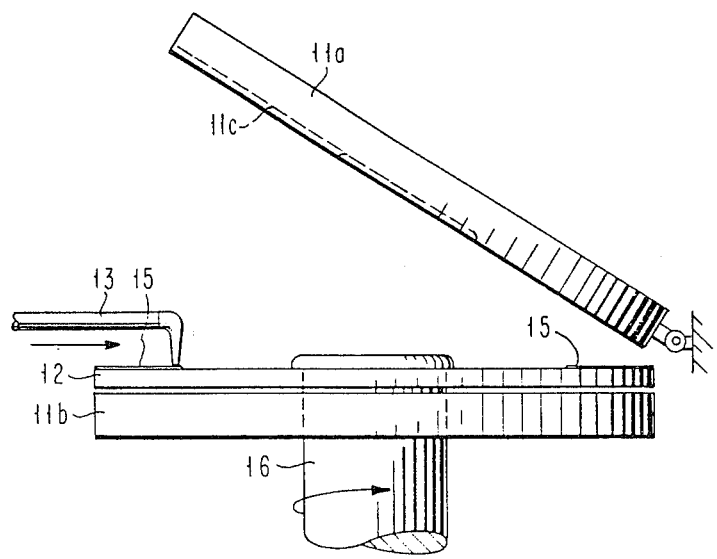
FIG. 1 illustrates apparatus for carrying out the present invention with the barrier spaced from the substrate while the magnetic coating dispersion is applied thereto.

The barrier employed in the present invention may be of any suitable type and preferably is a circular plate having a diameter equal to or greater than that of the substrate to be coated. One particularly effective form for the plate member is shown in FIG. 1, in the form of a circular electromagnet 11a which is commonly used to magnetically orient the magnetic particles in a magnetic disk coating which has just been spin coated onto a rotating disk substrate. By means of a opening or groove cut in the face of the barrier which becomes a tunnel when the barrier is in position over the coated disk, the coating wedge profile can be controlled. The size and shape of this groove or tunnel determines to a large degree the coating wedge profile. Such a groove 11c is shown in barrier member 11a and is shown in more detail in FIG. 3. Groove or tunnel 11c extends radially through barrier 11a to allow communication of air or other fluid between the OD and the ID of barrier member 11a and hence allow fluid communication with the disk coating during spin-off. Opening 11c occupies less than 360° of the periphery of barrier plate member 11a, and it has been found that a particularly effective groove or tunnel 11c in a barrier member having a diameter of approximately 14 inches is a uniform groove 1½ inches wide and 0.100 inches deep.

In operation, the upper portion 11a of the magnet is hinged so that it can be rotated away from the disk while a magnetic dispersion is poured onto the substrate from a nozzle or gun 13 which is movable radially of the substrate 12, as is well known in the art. Substrate 12 is rotated by means represented by shaft 16 and has the lower portion 11b of the orientation magnet disposed underneath it. As is known in the art, upper portion 11a of the magnet may be provided with four spaced electromagnet members which, when energized, magnetically cooperate with lower magnet portion 11b to magnetically align the magnetic particles in coating 15 to provide improved recording performance of the resulting magnetic disk.

The magnetic coating formulation employed in practicing the present invention may be of any suitable type, such as that disclosed in U.S. Pat. No. Re. 28,866, or in copending application Ser. No. 260,440, filed May 4, 1981.

Figure 2:
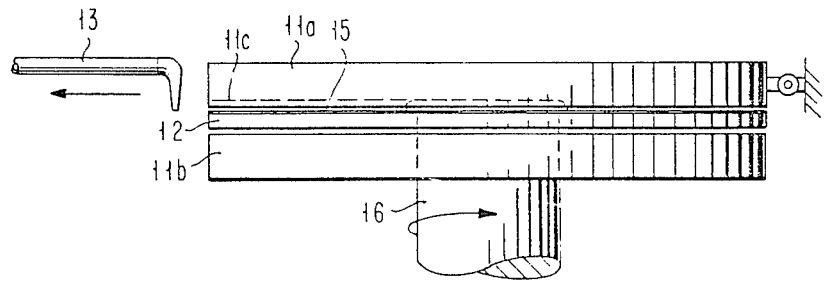
FIG. 2 illustrates the barrier in position closely adjacent the coated substrate during coating spin-off.

In accordance with the present invention, after nozzle 13 has completed depositing the magnetic coating dispersion on rotating substrate 12 and has withdrawn beyond the outside diameter of the substrate, upper portion 11a of the orienting magnet is quickly lowered to be positioned closely adjacent the coated disk having a layer 15 of the magnetic coating dispersion thereon, as shown in FIG. 2. Magnetic portion 11a forms the barrier of the present invention and is maintained in a position closely adjacent coating layer 13 during the coating spin-off step of the process.

Figure 3:
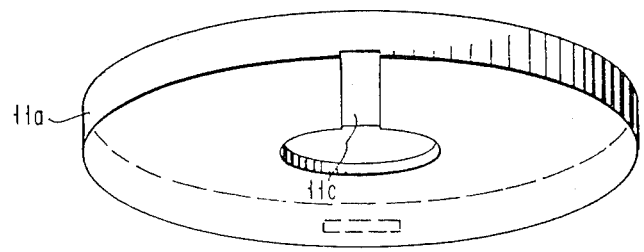
FIG. 3 illustrates a preferred embodiment of the opening, tunnel, or groove in the barrier.

Examples of the effects of different barrier spacings in accordance with the present invention are listed in Table 1. This table lists coating and wedge thickness for different barrier-coating spacings at different spin-off rpms, using a barrier member with a radial opening therein as shown in FIG. 3. The magnetic coating composition employed was one in use for spin coating currently produced magnetic disks.

TABLE 1

COATING THICKNESS vs. BARRIER SPACING

| Barrier/ Substrate Spacing | A .025" | B .040" | C .060" | D .080" | E .100" | F X (Average) |
|---|---|---|---|---|---|---|
| Spin-off Delay 200 rpm - Spin-off rpm 4000 | | | | | | |
| ID | 25.8µ" | 26.9µ" | 28.0µ" | 27.3µ" | 28.9µ" | 27.4µ" |
| MD | 28.1 | 29.8 | 31.6 | 31.8 | 34.3 | 31.1 |
| OD | 29.0 | 31.4 | 34.3 | 37.6 | 39.6 | 34.4 |
| Wedge | 3.2 | 4.5 | 6.3 | 10.3 | 10.7 | 7.0 |
| Spin-off Delay 200 rpm - Spin-off rpm 3000 | | | | | | |
| ID | 32.3 | 33.5 | 32.4 | 32.2 | 33.7 | 32.8 |
| MD | 33.6 | 35.3 | 36.1 | 36.9 | 39.3 | 36.2 |
| OD | 34.5 | 37.6 | 39.5 | 42.3 | 44.7 | 39.7 |
| Wedge | 2.2 | 4.1 | 7.1 | 10.1 | 11.0 | 6.9 |
| Spin-off Delay 525 rpm - Spin-off rpm 4000 | | | | | | |
| ID | 30.6 | 32.0 | 31.3 | 31.8 | 32.3 | 31.6 |
| MD | 31.9 | 34.7 | 34.7 | 36.0 | 38.1 | 35.1 |
| OD | 32.9 | 35.9 | 37.9 | 41.6 | 44.6 | 38.6 |
| Wedge | 2.3 | 3.9 | 6.6 | 9.8 | 12.3 | 7.0 |
| Spin-off Delay 525 rpm - Spin-off rpm 3000 | | | | | | |
| ID | 37.0 | 36.9 | 36.8 | 36.8 | 37.7 | 37.0 |
| MD | 37.7 | 39.4 | 40.8 | 41.5 | 42.9 | 40.5 |
| OD | 38.9 | 41.3 | 44.1 | 47.0 | 48.7 | 44.0 |
| Wedge | 1.9 | 4.4 | 7.3 | 10.2 | 11.0 | 7.0 |

The effects of the different barrier spacings on final coating thickness can be clearly seen from Table 1, the closer barrier spacings producing thinner coatings.

As a means for direct comparison to what was being accomplished by using a barrier in spin coating, control disks were made. For each of the five barrier spacings examined, two control disks were made. This was to assure that no significant change in the coating composition had taken place. The control disks were coated at 3000 and 4000 rpm, the same as the experimental disks. The barrier spacing and spin-off delay rpm variables were not applicable to the control disks. These control results are listed below in Table 2.

TABLE 2

COATING THICKNESS CONTROLS NO BARRIER USED

| | A | B | C | D | E | F X (average) |
|---|---|---|---|---|---|---|
| Spin-off - rpm 4000 | | | | | | |
| ID | 39.7µ" | 39.9µ" | 39.0µ" | 37.5µ" | 39.3µ" | 39.1µ" |
| MD | 46.8 | 47.6 | 46.6 | 46.5 | 45.6 | 46.6 |
| OD | 49.6 | 51.0 | 49.5 | 48.1 | 49.7 | 49.6 |
| Wedge | 9.9 | 11.1 | 10.5 | 10.6 | 10.4 | 10.5 |
| Spin-off - rpm 3000 | | | | | | |
| ID | 43.8 | 43.1 | 43.0 | 43.0 | 42.8 | 43.1 |
| MD | 50.6 | 50.6 | 50.5 | 50.0 | 50.1 | 50.4 |
| OD | 53.1 | 54.8 | 52.5 | 53.3 | 54.2 | 53.6 |
| Wedge | 9.3 | 11.7 | 9.5 | 10.3 | 11.4 | 10.4 |

The reduction in coating thickness brought about by the present invention is clearly seen by comparing the figures in Tables 1 and 2.

To indicate the effectiveness of the opening in the barrier member in accordance with the present invention in reducing or eliminating the wedge in the finished coating, tests were conducted coating disks using a barrier member without an opening therein and a barrier member having a radial opening therein as described above. Some of this test data is listed below.

| Disk Thickness | Barrier Spin Coating No Opening | Barrier Spin Coating With Opening |
|---|---|---|
| Outside Diameter | 29 micro inches | 27 micro inches |
| Middle Diameter | 24 micro inches | 26 micro inches |
| Inside Diameter | 28 micro inches | 25 micro inches |

It can be seen from the above data that the use of an opening in the air barrier member can effectively eliminate the wedge in the finished coating, and additional test data has confirmed this. One major advantage of the elimination of the coating wedge is that it aids in producing an essentially flat coating after buffing, whereas even after buffing coatings with wedges therein still retain the wedge.

To report a coating wedge as the difference in coating thickness between the disk ID and the disk OD is incomplete. That tells nothing of the wedge profile, the area between the disk ID and OD. Current disk spin-coat processes produce a wedge of about 12µ". However such coatings exhibit a sharp coating thickness increase from the disk ID to the MD, then a leveling off from the MD to the OD. The air fluid barrier of this invention provides control for not only the disk ID-OD coating thickness but for the coating wedge profile as well.

As an additional technique to improve the quality of the finished disk, an inert gas such as nitrogen or helium may be introduced into opening 11c during coating spin-off as an alternate to the ambient air which would otherwise be drawn into opening 11c. It has been found that such use of an inert gas reduces air turbulence over the coating and improves the surface properties of the finished disk.

To further emphasize the flexibility of barrier spin coating, it has been demonstrated that particulate disks with reverse coating wedges can be spin coated; that is coatings which are thicker at the ID than at the OD. This is accomplished by injecting a gas through the barrier during the disk spin-off cycle. By varying the amount of gas and where it is injected, the reverse coating wedge profile can be controlled. Such reverse wedges are produced by injecting gas in a manner which results in more gas at the ID than at the OD so that solvent evaporation in the ID region is higher than in the OD region. Disks with reverse wedges up to 9µ" have been spin coated.

I claim:

1. Apparatus for use in spin coating a liquid magnetic dispersion containing volatile solvent material onto a rotating annular substrate to form a magnetic coating on said substrate, comprising drive means for rotating said substrate as said liquid dispersion is applied thereto, and a substantially solid non-rotatable fluid barrier plate means positioned closely adjacent said substrate after application of said liquid dispersion thereto, said barrier plate means serving to reduce evaporation of said volatile solvent material to thereby permit said dispersion to flow more readily over said substrate to form a thinner magnetic coating;

said barrier plate means having an inner portion and an outer portion, and said barrier plate means having a shallow recess formed in a minor fractional portion of its surface adjacent the substrate and extending radially between said inner portion and said outer portion to permit fluid communication therebetween.

2. Apparatus in accordance with claim 1, in which said barrier plate means is positioned between 0.025 inches and 0.100 inches from said coated substrate.

3. Apparatus in accordance with claim 1, in which said barrier plate means is an annular member having a diameter equal to or greater than the diameter of said substrate.

4. Apparatus in accordance with claim 1 including means for introducing an inert gas into said opening.

5. Apparatus for use in spin coating a liquid magnetic dispersion containing volatile solvent material onto a rotating annular substrate to form a magnetic coating on said substrate, comprising drive means for rotating said substrate as said liquid dispersion is applied thereto, and a substantially solid non-rotatable fluid barrier plate means rockable from one position, in which it is disposed away from the substrate to permit application of the liquid dispersion thereto, to another position in which it is disposed closely adjacent said substrate after application of said liquid dispersion thereto, said barrier plate means when in said other position serving to reduce evaporation of said volatile solvent material to thereby permit said dispersion to flow more readily over said substrate to form a thinner magnetic coating;

said barrier plate means having a shallow recess formed in a minor fractional portion of its surface adjacent the substrate and extending radially to facilitate fluid communication between the central and peripheral portions thereof.

* * * * *